United States Patent [19]

Kim et al.

[11] Patent Number: 5,783,655
[45] Date of Patent: Jul. 21, 1998

[54] AROMATIC POLYAMIDE PULP BY MEANS OF CONTINUOUS TRANSFERABLE POLYMERIZATION-ORIENTATION METHOD AND A PROCESS FOR PREPARATION THEREOF

[75] Inventors: Du Hyun Kim; Seock Chul Ryu, both of Kumi; Won Jun Choe, Talseou-ku; Young Hwan Park, Kumi; Chang Seop Ji, Suwon, all of Rep. of Korea

[73] Assignee: Kolon Industries, Inc., Seoul, Rep. of Korea

[21] Appl. No.: 446,730

[22] PCT Filed: Dec. 2, 1993

[86] PCT No.: PCT/KR93/00108

§ 371 Date: Jun. 5, 1995

§ 102(e) Date: Jun. 5, 1995

[87] PCT Pub. No.: WO94/13727

PCT Pub. Date: Jun. 23, 1994

[30] Foreign Application Priority Data

Dec. 4, 1992 [KR] Rep. of Korea ............ 92-23333
Sep. 2, 1993 [KR] Rep. of Korea ............ 93-17448

[51] Int. Cl.⁶ ............... C08G 69/32; C08G 69/36
[52] U.S. Cl. ............ 528/331; 528/125; 528/128; 528/183; 528/184; 528/185; 528/189; 528/310; 528/321; 528/332

[58] Field of Search ............ 528/310, 331, 528/183, 184, 185, 321, 189, 332, 125, 128

[56] References Cited

U.S. PATENT DOCUMENTS 5,097,015  3/1992  Miess et al. ............ 528/331

FOREIGN PATENT DOCUMENTS 379 157    11/1985  Austria.
2 226 819   7/1990  United Kingdom.

Primary Examiner—P. Hampton-Hightower
Attorney, Agent, or Firm—Oblon, Spivak, McClelland, Maier & Neustadt, P.C.

[57] ABSTRACT

A process for the preparation of aromatic polyamide pulp having both excellent physical properties and a high degree of polymerization by continuous polymerization and orientation by using of mixed solutions. The solutions are prepared by reacting diamine with aromatic diacid dichloride in an amide and/or urea-based polymerization solvent containing inorganic salts, or a mixture of inorganic salts and a Lewis acid compound. The process can be practiced by polymerization-orientation apparatus located on the continuous transferable polymerization-orientation means comprised of a belt and one or more stirring bars.

29 Claims, 2 Drawing Sheets

AROMATIC POLYAMIDE PULP BY MEANS OF CONTINUOUS TRANSFERABLE POLYMERIZATION-ORIENTATION METHOD AND A PROCESS FOR PREPARATION THEREOF

TECHNICAL FIELD

The present invention relates to a process for preparing aromatic polyamide pulp. More particulary, the invention relates to a process for the preparation of polyamide pulp having both excellent physical properties and a high degree of polymerization wherein an aromatic diamine is reacted with aromatic diacid dichloride in an amide and/or urea-based polymerization solvent containing inorganic salts, or a mixture of inorganic salts and a Lewis acid compound.

BACKGROUND ART

U.S. Pat. No. 4,511,623 discloses a process for preparing an aromatic polyamide using solvent mixture of comprising inorganic salts wherein a tertiary amine is added into the amide solvent system.

According to this method, polyamide fibers are prepared by adding tertiary amines prior to polymerization and applying a high mechnical shear rate at the moment gelation is achieved, thus rapidly increasing the rate of polymerization and producing a high degree of orientation and a high degree of polymerization.

But, because U.S. Pat. No. 4,511,623 adds the amide solvent and excess tertiary amines simultaneously, and adds the diacid dichloride all at once, the viscosity of the reaction mixture suddenly increases while polymerization is occurring. Accordingly, polymerization is rapidly terminated (within 10 seconds) and control of the process becomes very difficult. In fact, it is impossible to continuously produce fibers, particularly fibers having a high degree of polymerization which can take 5 hours.

In order to overcome the problems of the prior art the present inventors discovered a process for producing pulp comprising extruding a liquid crystalline pre-polymer (LCP) through an orientation unit, spraying, and contact with a tertiary amine solvent system (e.g., Korean published patent 90-4911). However, because gelation of polymer solution in this process is initiated by the wall surface of the orientation unit the orientation unit becomes clogged, and control of the process becomes difficult.

U.S. Pat. No. 5,106,560 discloses a process for the preparation of pulp by providing a polymerization solution of diacid dichloride, diamine and inorganic salts in an amide solvent system, followed by pouring the solution on a inclined support to provide orientation by means of gravity-induced shear forces. However, by using natural gravity molecular orientation it is impossible to produce pulp having a high degree of orientation.

U.S. Ser. No. 07/87,565 (filed Apr. 28, 1992 by the present inventors) discloses a method wherein an anisotropic polymerizing solution is continuously ejected into container, where it remains to mature. Unfortunately, this method has the same drawback as U.S. Pat. No. 5,106,560 which provides orientation by means of gravity-induced shear forces in that a relatively low degree of orientation is achieved.

When an anisotropic polymerization solution having low inherent viscosity is ejected according to U.S. Ser. No. 07/87,565, the properties of the final product are poor, and it takes approximately 0.5~5 hrs to increase the inherent viscosity and degree of orientation of the polymerizing solution. Similarly, the degree of molecular orientation obtained by means of gravity shear is lower than that obtained by means of stirring, which results in decreased fibril growth in the final pulp and an increase in the time required for growth of fibrils having acceptable specific surface areas due to the low degree of orientation. Further, the properties of final product (e.g., as friction materials or gaskets) which are made from such a final pulp are poor.

Generally, in the case of friction materials containing fibers, the friction effect applied to a matrix is increased with an increase in the specific surface area of the fiber while the adhesion effect increases as the length of pulp increases; these behaviors are considered to be mutually compromising factors, and lead to the use of powders which have high friction efficiencies due to a high surface area but provide low material reinforcement.

Therefore, when the degree of orientation of the molecular chain is high, the specific surface area can be increased by the formation of fibrils, and the pulp has enough its length to reveal high adhesion effect. But if the degree of orientation is low, the length of pulp is not sufficient to increase the adhesion effect for final materials, while the specific surface area is increased due to the powder form.

DISCLOSURE OF INVENTION

It is an object of the present invention to provide an aromatic polyamide pulp wherein the aforesaid problems of prior art are avoided.

It is also an object of the present invention to provide aromatic polyamide pulp by an easy, stable and cheap process without using expensive tertiary amines and which avoids process line solidification problems due to gelation.

Another object of the invention is to continuously provide a high molecular weight aromatic polyamide pulp having excellent microfibril growth and sufficient length to be utilized as reinforcement materials.

To achieve the aforesaid objects, the present invention provides a process for the preparation of aromatic polyamide pulps having repeating units represented by the following formula (A).

wherein $R_1$, $R_2$ are selected from the group consisting of the following aromatic groups,

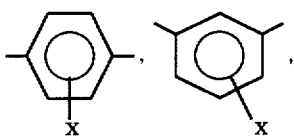

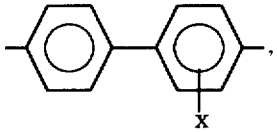

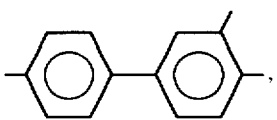

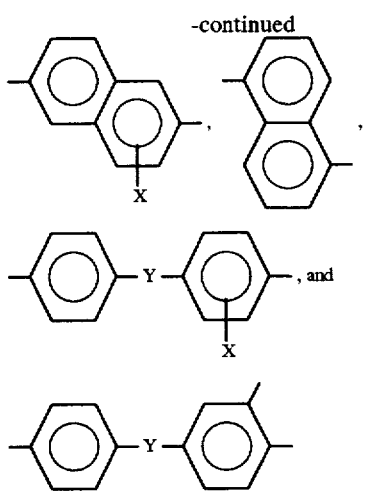

X is H, Cl, Br,

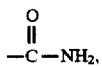

or alkyl or alkoxy group of from 1 to 4 carbon atoms, Y is

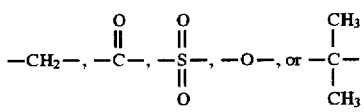

Other and further objects, features and advantages of the invention will appear more fully in the following description.

Figure 1:
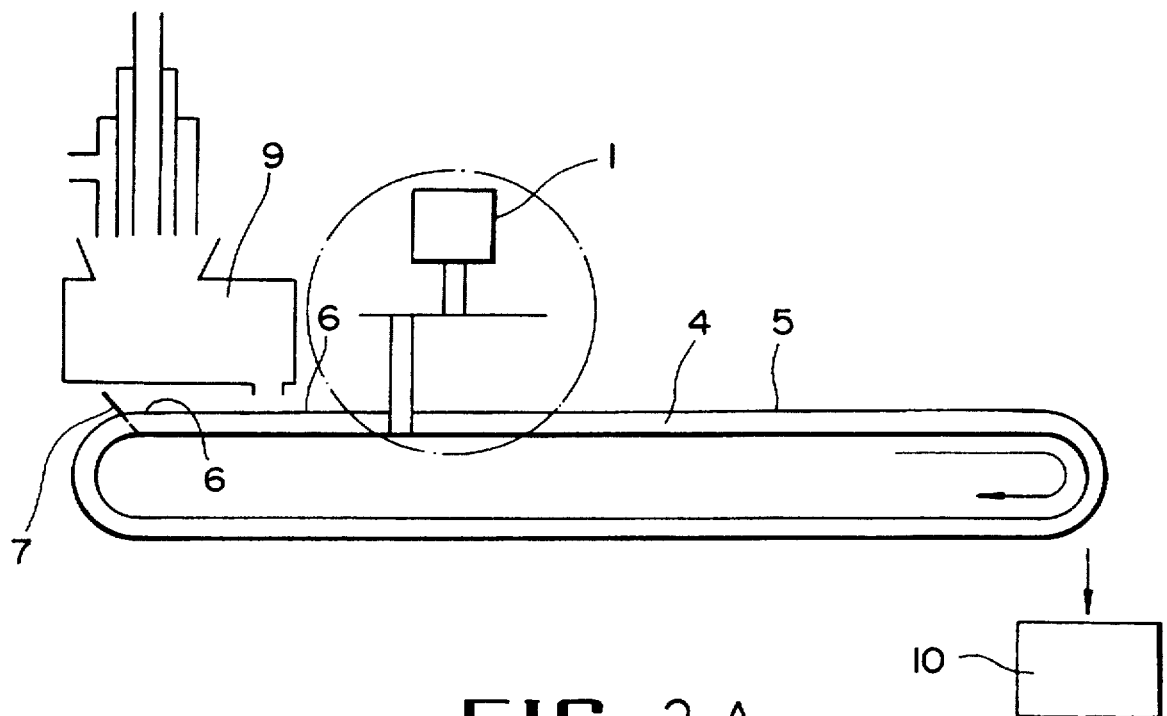
FIG. 1 illustrates diagrammatically a preferred process in accordance with the present invention.

(A) air layer (B) aromatic diamine solution (C) The first aromatic diacid solution (D) The first mixed solution (E) The second aromatic diacid solution

BEST MODE FOR CARRYING OUT THE INVENTIONS

In the present invention, aromatic polyamide pulp is prepared by the following process;

(a) providing a polymerization solvent by adding one or more inorganic salts into amide-based or urea-based organic solvent system or into a mixture of amide-based and urea-based organic solvent system;

(b) preparing a first solution by dissolving one or more aromatic diamines in said polymerization solvent, and then adding 20–50 wt % of a total 100 wt % amount of one or more aromatic diacid dichlorides which will react with the one or more aromatic diamines in equivalent moles;

(c) adding said first solution and the remainder 50–80 wt % of the one or more aromatic diacid dichloride to a continuous mixer simultaneously with mixing, and then ejecting said mixed solution onto a means for continuous transferable polymerization-orientation;

(d) polymerizing and orienting said mixed solution obtained in step (c) by polymerization orientation means located on the continuous transferable polymerization-orientation means;

(e) maintaining and maturing the polymerized and oriented mixed solution obtained in (d) at a predetermined temperature for a predetermined time in the continuous transferable polymerization-orientation system;

(f) precipitating the material obtained in (e) above into a precipitating solution, and then pulverizing and drying the precipitated material in a pulping means.

The present invention is explained in more detail as follows:

1) Preparation of the Polymerization Solvent

In the present invention, amide-based or an urea-based organic solvent system, or mixture thereof, are used as the polymerization solvent. Any wt % mixture may be used.

Preferred amide-based or urea-based organic solvents used in the invention include, for example, N-methyl-2-pyrrolidinone (NMP), N,N-dimethyl acetamide (DMAc), hexamethylphosphoamide (HMPA), N,N-dimethylformamide (DMF), N,N,N',N'-tetramethylurea (TMU) or combinations thereof.

One or more inorganic salts may be added to the above organic solvent system in order to increase the solubility of the eventual polymer. Preferred inorganic salts include metal halides or alkali earth metal halide salts such as $CaCl_2$, LiCl, NaCl, KCl, LiBr, KBr. A single salt or a mixture of inorganic salts may be added.

The amount of inorganic salts added to the solvent is preferably less than 12 wt % based on the total weight of polymerization solvent.

When the amount of inorganic salts is more than 12 wt %, it is not economical becuase further desired effects are not achieved.

A small amount of one or more Lewis acids may be added to the polymerization solvents in addition to the inorganic salt(s) in order to further increase the solubility of the polymer. Preferred Lewis acid compounds are selected from the group consisting of compounds of halogen atoms and transition metals, and compounds of halogen atoms and Group IIIA, IVA, VA, and VIA atoms of the periodic table, including $BF_3$, $BCl_3$, $AlCl_2$, $MgCl_3$, $FeCl_2$, $FeCl_3$, $ZnCl_2$, $SbCl_2$ and $HgCl_2$. The amount of Lewis acid added is preferably from 0.1 to 5 wt % on the basis of the total weight of polymerization solvent.

When the amount of Lewis acid is less than 0.1 wt %, the increase in the solubility of the final polymer and its molecular weight is no more than that obtained with the simple addition of inorganic salts.

When the amount of Lewis acid is more than 5%, while the solubility and molecular weight is increased, it is not economical.

According to the present invention, when mixtures of inorganic salts are used with Lewis acids, the inherent viscosity of the solution is increased due to an increase in solubility as compared with the case of using only inorganic salt(s).

2) Preparation of the First Solution

After an aromatic diamine solution is prepared by dissolving one or more aromatic diamines in the above-described polymerization solvent, the aromatic diamine solution is transferred to a mixer set at a predetermined temperature using a quantitative pump and temperature controller, and simultaneously 20 to 50 wt % of a total 100 wt % of one or more aromatic diamine in equivalent moles, is added thereto mixed, and reacted. The process of adding the aromatic diacid dichloride(s) is preferably carried out at a temperature of from 0 to 30° C.

The above first mixed solution (solvent, polyamide and some diacid dichloride) and remainder 50 to 80 wt % of aromatic diacid dichloride(s) are then simultaneously added to a continuous mixer using a pump and a temperature controller and mixed to provide a second mixed solution, and then the mixture is ejected onto means for continuous transferable polymerization-orientation, where it is stirrred and polymerized.

In the above process, it is possible to add all the aromatic diacid dichloride at once, but because mixing is not achieved uniformly due to an abrupt reaction and because side reactions have an effect on the properties of the final product, it is preferable to add it in two stages as above in order to obtain a uniform mixture.

Figure 4:
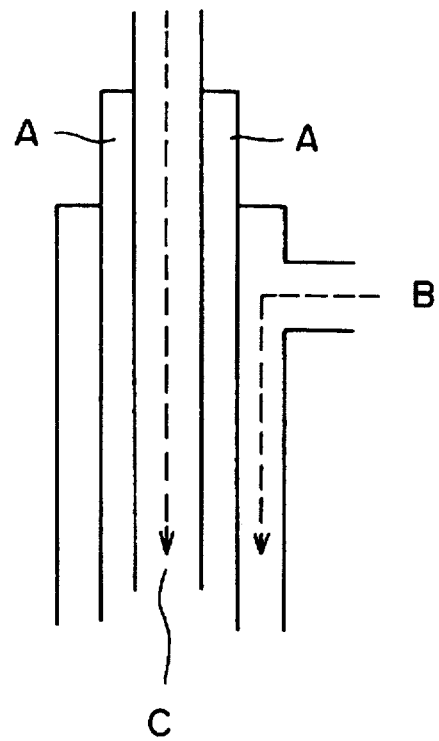
FIG. 4 and FIG. 5 represent depictions of ejector of raw material into mixer and a step of the first and second feeding.
Figure 5:
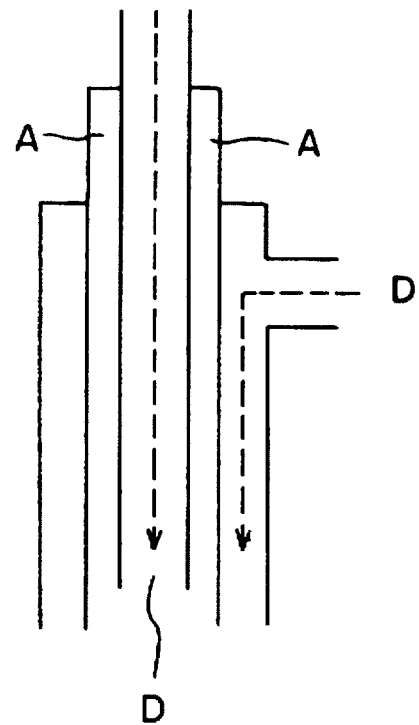

In order to obtain a uniform mixture in a short time, it is preferable to add the reactants together in same direction (parallel direction) by using an ejector like that represented in FIG. 4 and FIG. 5 when the first mixed solution and the remainder of aromatic diacid dichloride are added together and/or to the continuous mixer.

Generally it takes approximately 1~30 sec to mix the above reactants in a continuous mixer. Therefore, the present invention does not require a special polymerization reactor as prior art methods do to make possible the production of large quantities.

3) Polymerization, Orientation and Maturing of the Mixed Solution

The second mixed solution is ejected onto means for continuous transferable polymerization-orientation at a predetermined temperature, and the solution is stirred, optionally continuously, using polymerization-orientation means to increase the degree of polymerization and provide orientation (in the rotating direction). The average shear rate of the polymerization-orientation means is preferably more than 10/sec.

Figure 2A:
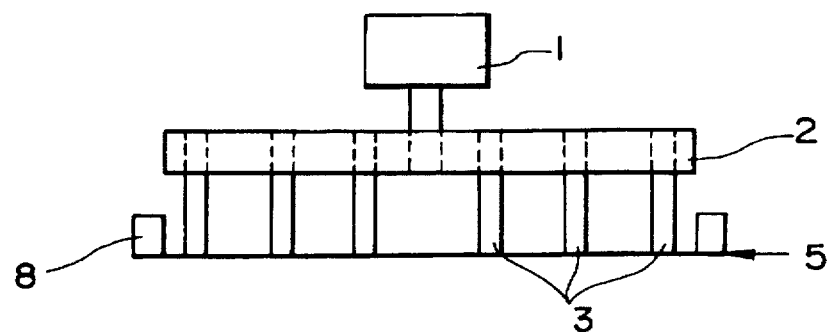
FIG. 2(A) is a front view of FIG. 1
Figure 2B:
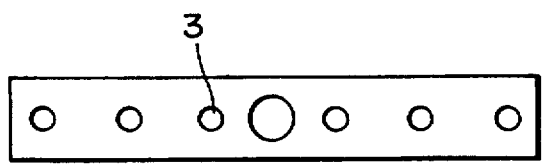
FIG. 2(B) is a plan view of the apparatus of FIG. 1
Figure 3:
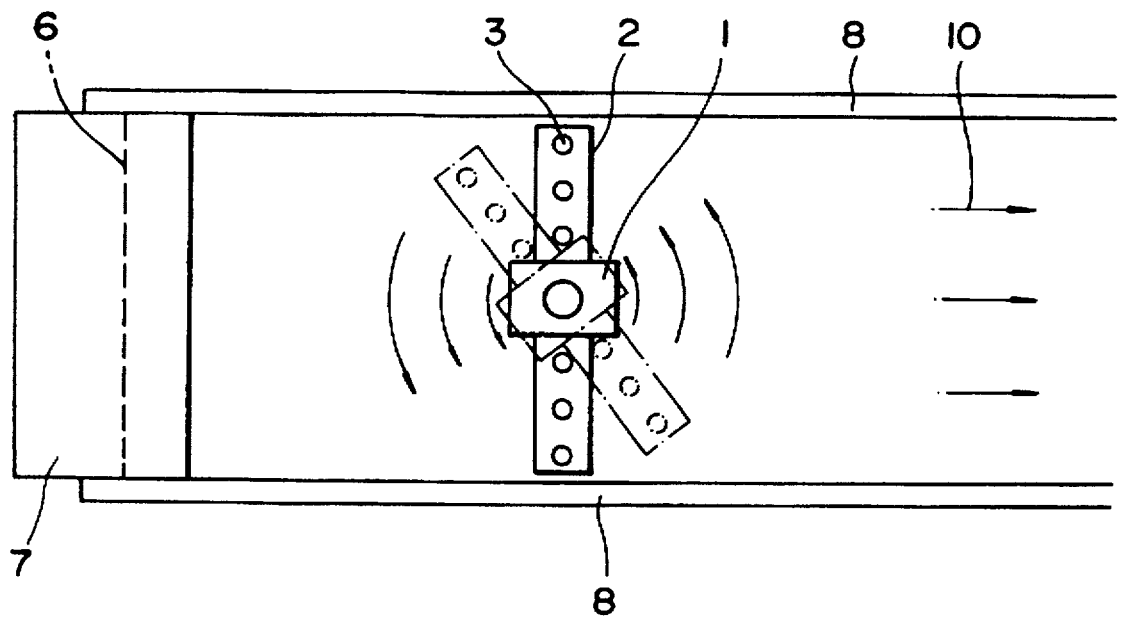
FIG. 3 is a front view of the belt part of FIG. 1

Referring now to the drawings, a continuous transferable polymerization-orientation system in accordance with the present invention is illustrated in FIG. 1 to FIG. 3.

The polymerization-orientation apparatus (circled) of the continuous transferable polymerization-orientation system of FIG. 1 can be moved from front to rear, and the rpm of all driving motors (1) can be controlled variably. The polymerization-orientation apparatus is fixed at a predetermined place on the system while belt (4) is moving at low speed to polymerize and provide orientation.

A guide (8) may be attached to both edges (6) of the belt to prevent the polymer solution from flowing to the side (5) of the belt and guide (7) may be located on the back edge of the belt to prevent the ejected polymer solution from flowing in the opposite direction of the belt progress direction.

Polymerization and orientation by stirring in the continuous transferable polymerization-orientation system is achieved within the turning radius of the rotating plate (2) of polymerization orientation apparatus. More than one polymerization-orientation stirring bar (3) can be used, and is assembled so that attachment and detachment is easy. Further, it is possible to use two or more polymerization-orientation apparatuses to polymerize and orient.

The obtained polymer, which is polymerized and oriented by stirring, is maintained on the continuous transferable polymerization-orientation system (e.g., on the belt) and matured at a temperature of from 25° to 100° C., for preferably 10 to 60 mins to increase the inherent viscosity and the degree of orientation of the polymer. When the maturing temperature is less than 25° C., the time required for maturing is extended and when it is more than 100° C., the inherent viscosity of the final pulp is decreased.

The concentration of polymer is preferably about 3 to 15% by weight of the polymerizing solvent. When the concentration of polymer is less than 3% by weight, it is not economical due to the low concentration although it is possible to produce a pulp having high inherent viscosity, and when the concentration of polymer exceeds 15% by weight, solubility is decreased and it is difficult to prepare a pulp having a high inherent viscosity.

4) Preparation of the Pulp

Matured polymer is precipitated into a precipitating solution and then added to pulping means (10), pulverized and dried to prepare polyamide pulp.

The precipitating solution of the present invention is preferably water or a basic aqueous solution, or a mixture of one of the above precipitating solutions and the polymerization solvent. A basic aqueous solution is used in order to remove the HCl gas generated in the polymerization reaction and to neutralize the system to prevent the inherent viscosity of polymer from decreasing due to the presence of acid and to prevent the apparatus from corroding. The object of using the mixture of precipitating solution and polymerization solvent is to control the extraction rate of polymerization solvent to reduce the time required for pulping and to promote microfibril growth. Preferred basic aqueous solutions are aqueous solutions selected from the group consisting of NaOH, KOH, $Na_2CO_3$, $K_2CO_3$, $NaHCO_3$, $Ca(OH)_2$, and CaO. The concentration of these aqueous solutions is preferred to be from 0.1 to 20% by weight in order to obtain neutralization and increased viscosity.

When using a mixed precipitating solution, the amount of the polymerization solvent is preferably less than 50% by weight of the total precipitating solvent. When the amount of the polymerization solvent is more than 50% by weight, the extraction rate of the solvent is decreased and provides a bad pulp shape.

Any conventional pulping machine can be used as the pulping means of the present invention.

According to the above method, an aromatic polyamide pulp having repeating units represented by formula (A) can be prepared:

wherein $R_1$, and $R_2$ are selected from the group consisting of the following aromatic groups,

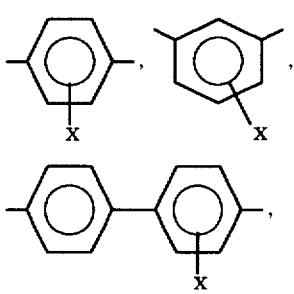

-continued

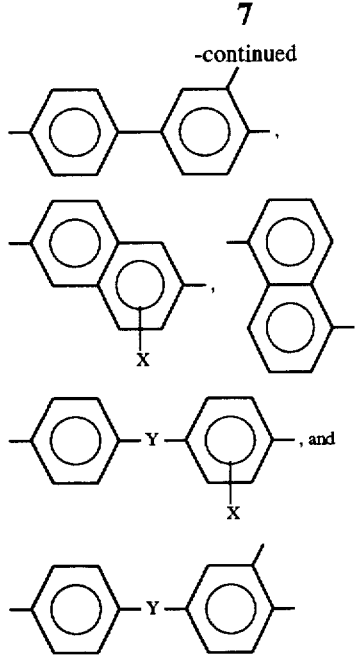

X is H, Cl, Br,

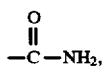

I or alkyl or alkoxy group of from 1 to 4 carbon atoms, Y is

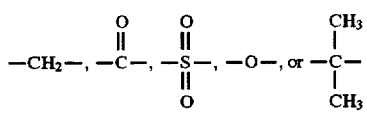

and where $R_1$ is the aromatic group of the aromatic diamine, and $R_2$ is the aromatic group of the aromatic diacid dichloride.

The inherent viscosity (I.V.) of the pulp prepared by the presnet invention is preferably more than 3.0 g/dl and the Canadian Standard Freeness is preferably within the range of 650 to 400 ml, and the length distribution as measured by BAUER-McNETT classifier is preferably
14 mesh or more is less than 30%,
28 mesh or more is more than 30%,
48 mesh or more is more than 60%,
100 mesh or more is more than 70%,
150 mesh or less is less than 25%,
where the screen mesh sizes are of the Tyler series and where the Canadian Standard Freeness and length distribution were measured by TAPPI T227 om-85 and TAPPI 233 om-82, respectively.

One of the main effects of the present invention is to increase the degree of polymerization and orientation in a short amount of time by utilization of a polymerization-orientation apparatus in a continuous transferable polymerization-orientation system without using expensive and harmful tertiary amines.

In conventional methods, it is impossible to orient continuoulsy a high viscosity polymer solution because gelation occurs due to abrupt reaction in the reactor, and the orientation apparatus is clogged by gelation.

The present invention solves the problem of gelation on a process line because polymerization and orientation is carried out in open means such as on a belt without using a closed system such as a polymerization tank or a polymerization reactor like conventional polymerization and orientation apparatuses.

Further, the present invention can control the polymerization temperature while reducing the energy consumption which is essential in the prior art to cool the polymerization reactor to low temperature due to the exothermic reaction in conventional methods, and can orient high viscosity solutions easily and continuously. One reason the present process is able to orient high viscosity solutions is that it is possible to maintain the effect of molecular orientation by stirring if the stirring is continued until the polymer is gelled. If molecular orientation is achieved by shear force, and then the shear force is removed before gelling, molecular orientation is lost and extremely low viscosity is obtained. Because in the present invention, orientation is continued until the polymer is gelled, the polymer does not return to the inordered state and obtains maximum orientation.

With the present invention, it is possible to reduce the time required for pulping due to the maximum orientation obtained and produce high micro-fibrillated aromatic polyamide pulp cheaply and continuously.

This invention is illustrated by the following Examples, but should not construed to be limited thereto.

The inherent viscosity (I.V.) of the pulp prepared invention is calculated by following equation.

$$I.V.(g/dl)=ln(\eta_{rel})/C$$

Wherein C is the concentration of polymer solution (5.0 g of polymer is dissolved in 100 ml of 95~98% conc. sulfuric acid), and relative viscosity $\eta_{rel}$ is the ratio of flowing time measured by capillary viscometer using 95~98% conc. sulfuric acid as solvent.

EXAMPLE 1

After the temperature of a reactor in which 700 kg N-methyl-2-pyrrolidinone was added was controlled to 70°, 56 kg of $CaCl_2$ was added thereto, stirred and completely dissolved.

To the above polymerization solvent was added 29.97 kg of p-phenylene diamine, stirred and dissolved to prepare the solution of aromatic diamine.

The above amine solution was added at the rate of 785.97 g/min using a quantitative pump to a mixer controlled at a temperature of 10° C. using a temperature controller, and, simultaneously, melted terephthaloyl chloride was added thereto at the rate of 19.69 g/min and mixed and reacted to prepare a first mixed solution.

To a continuous mixer, the first mixed solution and more melted terephthaloyl chloride was added at rates of 805.66 g/min and 36.57 g/min, respectively.

After the resulting solution was stirred in the continuous mixer for 10 sec, the mixed solution was fed into a continuous transferable polymerization-orientation system through an opening at a temperature of 50° C., and stirred and mixed at the shear rate of 20/sec to polymerize and orient until gelation was completed, and then maintained there for 30 mins and matured.

After the above solidified polymer was isolated from the continuous transferable polymerization-orientation system, it was precipitated into water and fed to a pulping machine, pulverized and dried to prepare a pulp.

The inherent viscosity of the pulp was 4.5, and Canadian Standard Freeness was 641 ml and the length distribution was, 14 mesh 29%, 28 mesh 22%, 48 mesh 36%, 100 mesh 5% and 150 mesh less than 8%.

EXAMPLE 2~9

The same procedure was carried out as described in Example 1 with the amount of components, conditions and properties provided in Table 1.

TABLE 1

| | Polymerization solvent | | | |
|---|---|---|---|---|
| | Liquid | | Amount of | Lewis Acid | |
| Example | Type | Amount (kg) | CaCl$_2$ (kg) | Type | Amount (kg) |
| 1 | NMP | 700 | 56 | — | — |
| 2 | NMP | 700 | 56 | — | — |
| 3 | NMP | 800 | 60 | — | — |
| 4 | NMP | 800 | 50 | AlCl$_3$ | 10 |
| 5 | NMP | 600 | 50 | — | — |
| 6 | NMP | 700 | 56 | — | — |
| 7 | NMP | 800 | 60 | — | — |
| 8 | NMP | 800 | 60 | — | — |
| 9 | NMP | 800 | 30 | MgCl$_2$ | 10 |

| | Mixing | | | | |
|---|---|---|---|---|---|
| | 1st solution | | | Final Solution | |
| | amine solution | | Amount | 1st solution | Amount |
| Example | Temp. (°C.) | Amount (g/min) | (g/min) | Temp. (°C.) | Amount (g/min) | (g/min) |
| 1 | 10 | 785.97 | 16.69 | 5 | 805.66 | 36.57 |
| 2 | 10 | 785.97 | 16.88 | 5 | 802.85 | 39.38 |
| 3 | 10 | 889.97 | 22.50 | 5 | 912.47 | 33.76 |
| 4 | 5 | 889.97 | 19.69 | 5 | 909.66 | 36.57 |
| 5 | 10 | 679.97 | 11.25 | 5 | 691.22 | 45.01 |
| 6 | 10 | 785.97 | 11.25 | 5 | 787.22 | 45.01 |
| 7 | 10 | 889.97 | 19.69 | 5 | 909.66 | 36.57 |
| 8 | 10 | 889.97 | 16.88 | 5 | 906.85 | 39.38 |
| 9 | 5 | 869.97 | 16.88 | 5 | 886.85 | 39.38 |

| | P/O system | | | |
|---|---|---|---|---|
| | shear rate | gelation | | |
| Example | (1/sec) | Temp (°C.) | Time (min) | Pulverizing solvent |
| 1 | 20 | 50 | 30 | water |
| 2 | 40 | 60 | 30 | aq. NaHCO$_2$ |
| 3 | 60 | 60 | 60 | 30% polyn. sol. 70% water |
| 4 | 140 | 60 | 60 | 20% polyn. sol. 80% water |
| 5 | 120 | 60 | 60 | 30% polyn. sol. 70% water |
| 6 | 180 | 50 | 50 | 90% polyn. sol. 10% water |
| 7 | 100 | 60 | 60 | 20% polyn. sol. 80% water |
| 8 | 60 | 60 | 60 | aq. Ca(OH)$_2$ |
| 9 | 100 | 30 | 30 | water |

TABLE 1-continued

| | | Properties | | | | |
|---|---|---|---|---|---|---|
| | | | Length Distribution | | | |
| Example | I.V. | Canadian Standard Freeness (ml) | more than 14 mesh (ml) | more than 28 mesh (%) | more than 48 mesh (%) | more than 100 mesh (%) | less than 150 mesh (%) |
| 1 | 4.5 | 641 | 29 | 22 | 36 | 5 | 8 |
| 2 | 4.7 | 628 | 29 | 20 | 36 | 5 | 10 |
| 3 | 5.8 | 602 | 23 | 21 | 36 | 11 | 9 |
| 4 | 6.4 | 547 | 28 | 20 | 21 | 12 | 14 |
| 5 | 4.1 | 497 | 26 | 17 | 28 | 14 | 15 |
| 6 | 5.2 | 468 | 25 | 24 | 24 | 15 | 12 |
| 7 | 5.9 | 582 | 22 | 17 | 38 | 10 | 13 |
| 8 | 5.3 | 613 | — | — | — | — | — |
| 9 | 4.0 | 647 | — | — | — | — | — |

NMP: N-methyl-2-pyrollidone,
TPC: Terephthaloyl chloride,
P/O system: polymerization-orientation system
polyn. sol.: polymerization solvent

<<COMPARATIVE EXAMPLE 1>>

After the temperature of a reactor in which 700 kg N-methyl-2-pyrrolidinone (NMP) was added was controlled to 70° C., 56 kg of CaCl$_2$ was added, stirred and completely dissolved.

To the above polymerization solvent was added 29.97 kg of p-phenylene diamine, stirred and dissolved to prepare the solution of aromatic diamine.

The above amine solution was added at the rate of 785.97 g/min using quantitative pump to the mixer and controlled at the temperature of 10° C. using temperature controller, and simultaneously melted terephthaloyl chloride was added thereto at the rate of 19.69 g/min and mixed and reacted to prepare the first mixed solution.

To a continuous mixer, the first mixed solution and more melted terephthaloyl chloride was added at the rates of 805.66 g/min and 36.57 g/min, respectively and mixed for 10 sec.

The temperature of the polymer inside the continuous mixer was controlled not to exceed 60° C.

The above mixed solution was continuously ejected onto a moving belt provided at the bottom of opening, and maintained thereon for 50 mins and matured.

The above solidified polymer was precipitated into 30% (NMP) solution of polymerization solvent and fed to the same pulping machine used in Examples 1~9, pulverized and dried to prepare a pulp as powder form.

The inherent viscosity of the pulp was 1.8.

<<COMPARATIVE EXAMPLE 2>>

After the temperature of reactor in which 700 kg N-methyl-2-pyrrolidinone was added was controlled at 70° C., 56 kg of CaCl$_2$ was added, stirred and completely dissolved.

To the above polymerization solvent was added 29.97 kg of p-phenylene diamine, stirred and dissolved to prepare the solution of aromatic diamine.

The above amine solution was added at a rate of 785.97 g/min using a quantitative pump to a mixer and controlled at the temperature of 10° C. using temperature control, and simultaneously melted terephthaloyl chloride was added thereto at a rate of 19.69 g/min and reacted to prepare a first mixed solution.

The first mixed solution and more melted terephthaloyl chloride were added at the rates of 805.66 g/min and 36.57 g/min, respectively on a moving belt, at a temperature of 60° C., and maintained there for 50 mins and matured.

The above mixed solution on the belt was not solidified and was precipitated into 30% NMP solution of polymerization solvent and fed to the pulping machine of Example 1, pulverized and dried.

The inherent viscosity of the pulp as powder form was 0.3.

<<COMPARATIVE EXAMPLE 3>>

After the temperature of reactor in which 600 kg N-methyl-2-pyrrolidinone was added was controlled at 70° C., 50 kg of $CaCl_2$ was added, stirred and completely dissolved.

To the above polymerization solvent was added 29.97 kg of p-phenylene diamine, stirred and dissolved to prepare the solution of aromatic diamine.

The above solution was added at a rate of 679.97 g/min using a quantitative pump to a mixer and controlled at a temperature of 10° C. using temperature control, and simultaneously melted terephthaloyl chloride was added thereto at the rate of 14.07 g/min and mixed and reacted to prepare the first mixed solution.

To the continuous mixer, the first mixed solution and melted terephthaloyl chloride was added at rates of 694.04 g/min and 42.19 g/min, respectively and mixed for 10 sec. The temperature of the polymer inside the continuous mixer was controlled not to exceed 60° C.

The above mixed solution was continuously ejected on a moving belt provided at the bottom of opening, and then maintained there for 50 mins and matured.

The above solidified polymer was precipitated into 30% NMP solution of polymerization solvent and fed to the pulping apparatus of Example 1, pulverized and dried to prepare a pulp as powder form.

The inherent viscosity of the pulp was 1.6.

Obviously, numerous modifications and variations of the present invention are possible in light of the above teachings. It is therefore to be understood that within the scope of the appended claims, the invention may be practiced otherwise than as specifically described herein.

What is claimed is:

1. A process for the preparation of aromatic polyamide pulp, which process comprises the steps of: urea-containing solvent, or a mixture thereof, and mixing therewith 20 to 50 wt % of one or more aromatic diacid dichlorides;

(c) adding said first mixture and the remainder 50 to 80 wt % of aromatic diacid dichloride to a continuous mixer simultaneously with mixing, and then ejecting said mixed solution onto a continuous transferable polymerization-orientation means;

(d) polymerizing and orienting said mixed solution obtained in (c) by polymerization orientation means located on the continuous transferable polymerization-orientation means;

(e) maintaining and maturing said polymerized and oriented mixed solution obtained in (d) in the continuous transferable polymerization-orientation means;

(f) precipitating the material obtained in (e) into a precipitating solution, and then pulverizing and drying the precipitate in pulping means;

(g) obtaining an aromatic polyamide pulp having repeating units represented by the following formula (A):

$$-N(H)-R_1-N(H)-\overset{O}{\underset{\|}{C}}-R_2-\overset{O}{\underset{\|}{C}}- \quad (A)$$

wherein $R_1$, $R_2$ are selected from the group consisting of the following aromatic groups,

[aromatic group structures showing: phenylene with X substituent; phenylene with X in meta position; biphenyl with X; biphenyl with X and methyl; naphthalene structures; two phenyl rings connected by Y with X; two phenyl rings connected by Y with methyl]

X is H, Cl, Br, $$-\overset{O}{\underset{\|}{C}}-NH_2,$$

or alkyl or alkoxy group of from 1 to 4 carbon atoms, Y is $$-CH_2-,\ -\overset{O}{\underset{\|}{C}}-,\ -\overset{O}{\underset{\underset{O}{\|}}{\overset{\|}{S}}}-,\ -O-,\ \text{or} -\overset{CH_3}{\underset{CH_3}{\overset{|}{C}}}-.$$

2. An aromatic polyamide pulp having an inherent viscosity of more than 4.7 g/dl and a Canadian Standard Freeness of less than 650 ml.

3. The aromatic polyamide pulp according to claim 2, wherein said aromatic polyamide is poly(p-phenyleneterephthalamide).

4. An aromatic polyamide pulp having an inherent viscosity of more than 3.0 g/dl, a Canadian Standard Freeness of less than 650 ml and a pulp length distribution at 14 mesh or more or less than 30%, at 28 mesh or more of more than 30%, at 48 mesh or more of more than 60%, at 100 mesh or more of more than 70%, and at 150 mesh or less of less than 25%.

5. The aromatic polyamide pulp according to claim 4, wherein said aromatic polyamide is poly(p-phenyleneterephthalamide).

6. The process of claim 1, wherein said polymerization solvent further comprises one or more inorganic salts.

7. The process according to claim 1, wherein said organic solvents are selected from the group consisting of N-methyl-2-pyrrolidinone, N,N-dimethylacetamide, hexamethylphosphoamide, N,N-dimethylformamide, N,N,N',N'-tetramethylurea, and mixtures thereof.

8. The process according to claim 6, wherein said inorganic salts are selected from the group consisting of $CaCl_2$, LiCl, NaCl, KCl, LiBr, KBr, and mixtures thereof.

9. The process according to claim 8, wherein the amount of said inorganic salts is 0.1 to 12% by weight of said polymerization solvent.

10. The process according to claim 1, where one or more Lewis acid compounds is added to said polymerization solvent.

11. The process according to claim 10, wherein said one or more Lewis acid compounds is selected from the group consisting of $BF_2$, $BCl_3$, $AlCl_3$, $MgCl_2$, $FeCl_2$, $FeCl_3$, $ZnCl_2$, $SbCl_2$, $HgCl_2$, and mixture thereof.

12. The process according to claim 10, wherein the amount of said one or more Lewis acid compounds is 0.5 to 5% by weight of said polymerization solvent.

13. The process according to claim 1, wherein said aromatic diamine/polymerization solvent solution and said 20–50 wt % of said aromatic diacid dichloride in step (b), and said first mixture and said remainder aromatic diacid dichloride of step (c) are mixed in parallel direction.

14. The process according to claim 13, wherein said mixing is accomplished with the ejector.

15. The process according to claim 1, wherein said continuous transferable polymerization-orientation means comprises a belt and one or more stirring bars.

16. The process according to claim 15, wherein said one or more stirring bars rotate around an axis perpendicular to an upper surface of the belt.

17. The process according to claim 15, comprising plural stirring bars.

18. The process according to claim 15, wherein a guide is provided to prevent said solution ejected from flowing in a direction opposite to the progress of the belt.

19. The process according to claim 15, wherein guides are provided at both edges of said belt to prevent said solution from flowing to the side of said belt.

20. The process according to claim 15, wherein said one or more stirring bars are provided at an upper part of said belt.

21. The process according to claim 1, wherein in step (c) said solution is ejected on the continuous transferable polymerization-orientation means by free fall.

22. The process according to claim 1, wherein the concentration of said polymer is 3 to 15% by weight of said total polymerization solution.

23. The process according to claim 1, wherein polymerization and orientation is carried out until the polymer is gelled.

24. The process according to claim 1, wherein in step (e) polymer solution is matured by maintaining said solution at a temperature of 25° to 100° C., for 10 to 60 mins.

25. The process according to claim 1, wherein said precipitating solution is selected from the group consisting of water, basic aqueous solution, and mixtures of one water or a basic aqueous solution with said polymerization solvent.

26. The process according to claim 25, wherein said basic aqueous solution is selected from the group consisting of aqueous solutions of NaOH, KOH, $Na_2CO_3$, $K_2CO_3$, $NaHCO_2$, $Ca(OH)_2$ and CaO.

27. The process according to claim 26, wherein the concentration of said basic aqueous solution is 0.1 to 20 wt %.

28. The process according to claim 25, wherein the amount of polymerization solvent in said mixed precipitation solution is less than 50% by weight of said total precipitating solution.

29. The process according to claim 1, wherein said aromatic polyamide is poly(p-phenylene terephthalamide).

* * * * *